No. 818,326. PATENTED APR. 17, 1906.
G. M. WILLIAMS.
TRUCK.
APPLICATION FILED MAR. 13, 1905.
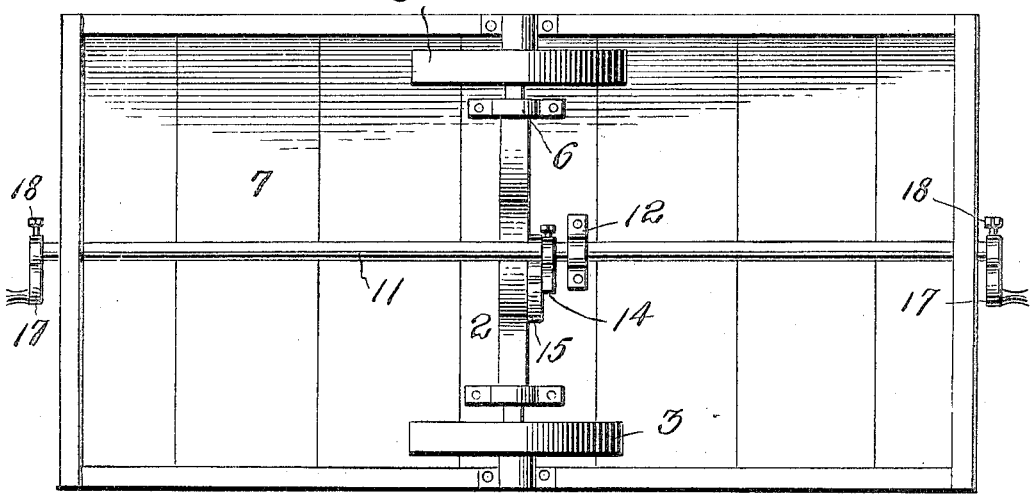
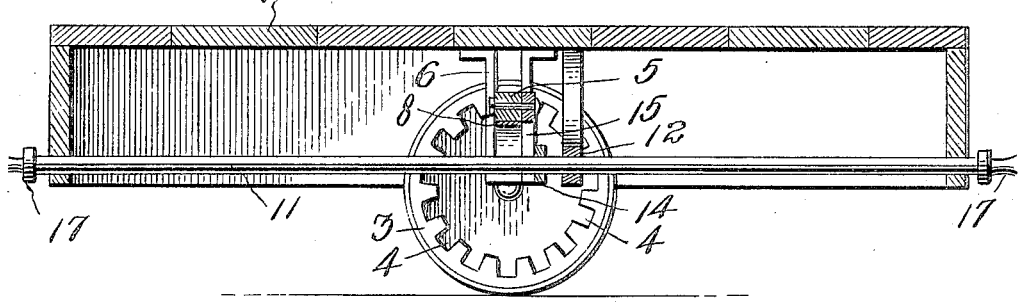
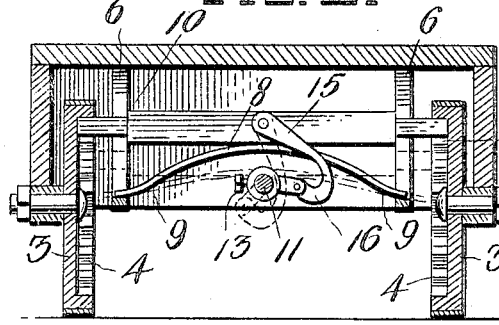
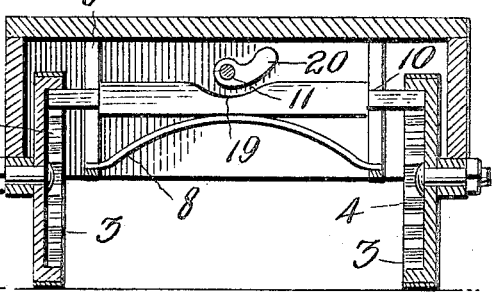
Witnesses
Jas. A. Koehl.
C. H. Griesbauer.
Inventor
G. M. Williams.
by H. B. Willson
Attorney

UNITED STATES PATENT OFFICE.

GEORGE MILTON WILLIAMS, OF FRESNO, CALIFORNIA.

TRUCK.

No. 818,326. Specification of Letters Patent. Patented April 17, 1906.

Application filed March 13, 1905. Serial No. 249,928.

*To all whom it may concern:*

Be it known that I, GEORGE MILTON WILLIAMS, a citizen of the United States, residing at Fresno, in the county of Fresno and State of California, have invented certain new and useful Improvements in Trucks; and I do declare the following to be a full, clear, and exact description of the invention, such as will enable others skilled in the art to which it appertains to make and use the same.

My invention relates to certain new and useful improvements in trucks of that class especially adapted for use in stores, warehouses, and like business places for readily moving or transporting barrels, boxes, and similar articles or objects.

The object of the invention is to provide a simple, convenient, and efficient means for locking and supporting wheels of the truck against rotation when it is desired to have the truck remain stationary and for unlocking said wheels when it is desired to move the truck.

With the above and other objects in view the invention consists of certain novel features of construction, combination, and arrangement of devices hereinafter described and claimed.

It will be understood that latitude is allowed herein as to detail, as they may be changed or varied according to circumstances without departing from the spirit of my invention, and the same remain intact and be protected.

In the accompanying drawings, illustrating the preferred embodiment of my invention, Figure 1 is an inverted plan view of a truck equipped with my improved wheel-locking mechanism. Fig. 2 is a vertical longitudinal sectional view through the same. Fig. 3 is a vertical transverse sectional view showing in full and dotted lines the positions of the locking-bar, and Fig. 4 is a transverse sectional view through a slightly-modified form of my invention.

In carrying out my invention I employ a truck of the flat or horizontal type, such as is commonly used for transporting barrels, boxes, and the like from place to place in warehouses and other places of business, and equip the same with my improved brake or locking device 2, which coacts with the supporting-wheels 3 of said truck. As shown, the body of the truck is of rectangular form, and the two supporting-wheels 3 are suitably journaled at the center of its sides. Each of said wheels 3 has upon its inner faces adjacent to its periphery an annular series of notches or sockets 4, which are adapted to receive the ends of a transversely-disposed locking-bar 5. The latter is slidably mounted in a vertical plane in slotted guide-brackets 6, which are in the form of castings secured upon and depending from the under side of the bed or floor 7 of the truck. The said locking-bar 5 is held normally elevated and in engagement with the sockets 4 by means of a flat spring 8; but, if desired, coil-springs may be substituted for said flat spring. The latter, as shown, is secured at its center upon the under side of the bar 5 and has its downwardly-curved end 9 projecting through the slots formed in the brackets 6. It will be seen that said spring holds the locking-bar 5 normally in engagement with the sockets 4, the upward movement of said bar being limited by the periphery of the supporting-wheels 3, which closes the outer ends of the sockets 4.

Any desired means may be provided for preventing lateral or longitudinal movement of the bar 5; but I preferably provide upon said bar stops or shoulders 10, which engage the inner faces of the brackets 6.

In order to operate the locking-bar 5, and thus lock or unlock the supporting-wheels 3, I provide a rocking bar or rod 11, which is mounted at its center in a bracket or casting secured upon the under side of the floor 12, secured upon the under side of the floor 7, and has its ends projecting through the ends of the body of the truck. Adjacent to the center of the rocking rod 11 is removably and adjustably secured, by means of a set-screw 13, a crank-arm 14, which is pivotally connected to the locking-bar 5 by means of a link 15. This link has its lower end curved, as shown at 16, to permit its lower portion to pass under the center of the rocking rod 11. It will be seen upon reference to Fig. 3 of the drawings that when the parts are in their full-line position the spring 8 will exert its energy to retain the locking-bar 5 in the sockets 4 of the wheels, and thus lock the latter against rotation, and that when the parts are in the dotted-line position shown in said figure said spring will exert its energy to hold the locking-bar 5 in its lowered position and out of engagement with said sockets, owing to the shape of the end 16 of the link 15. In order to operate the rocking rod 11, I provide upon each of its ends crank-handles 17, which are removably and adjustably secured by means of set-screws 18.

The construction, operation, and advantages of the invention will be readily understood from the foregoing description, taken in connection with the accompanying drawings. It will be seen that when one of the crank-handles 17 is turned to move the link 15 downwardly the locking-bar 5 will have its ends disengaged from the sockets 4, so as to free the latter, and that when the lower curved end 16 of said link passes under and across the center of the rocking rod 11 the spring will exert its energy to hold the locking-bar 5 in its lowered position.

In Fig. 4 of the drawings I have shown a slightly-modified form of operating device for the locking-bar 5. In this construction I dispense with the link 15 and mount the rocking rod 11 above the locking-bar 5 and in alinement with a recess 19, formed in said bar 5. The crank-arm 14 in this form of my invention is provided with a cam portion 20, which coacts with said notch 19, so as to depress the locking-bar 5 when said rocking rod 11 is rotated by means of the crank-handles upon its ends.

While I have shown and described the preferred embodiments of my invention, it will be understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. A truck having its wheels each provided with an annular series of sockets, a sliding locking bar to coact with said sockets, a rocking bar or rod extending transversely to said locking-bar, a crank-arm upon said rocking bar, a curved link connecting said crank-arm and said locking-bar, a spring for holding said locking-bar either in or out of engagement with said sockets according to the position of said curved link and an operating crank-handle upon said rocking rod.

2. A truck of the character described, comprising a suitable body, supporting-wheels therefor, each provided with an annular series of sockets adjacent to its periphery, slotted guide-brackets upon said body, a transversely-extending locking-bar slidably mounted in said brackets and adapted to engage said sockets, a spring for retaining said bar normally in engagement with said sockets, a bearing upon said body, a longitudinally-extending rocking rod mounted in said bearing and extending through the ends of said body, crank-handles upon the ends of said rocking rod, a crank-arm upon said rocking rod and a curved link connecting said crank-arm and said locking-bar.

In testimony whereof I have hereunto set my hand in presence of two subscribing witnesses.

GEORGE MILTON WILLIAMS.

Witnesses:
JAMES GALLAGHER,
E. M. HARRIS.